(12) United States Patent
Vallbracht et al.

(10) Patent No.: US 11,639,114 B2
(45) Date of Patent: May 2, 2023

(54) EFFICIENCY OPTIMIZATION OF MULTI-MOTOR ELECTRIC VEHICLES

(71) Applicant: Proterra Operating Company, Inc., Burlingame, CA (US)

(72) Inventors: Jarred Vallbracht, Greenville, SC (US); Matthew Simonini, Greenville, SC (US)

(73) Assignee: Proterra Operating Company, Inc., Burlingame, CA (US)

( * ) Notice: Subject to any disclaimer, the term of this patent is extended or adjusted under 35 U.S.C. 154(b) by 182 days.

(21) Appl. No.: 15/656,037

(22) Filed: Jul. 21, 2017

(65) Prior Publication Data

US 2019/0023153 A1    Jan. 24, 2019

(51) Int. Cl.
| | |
|---|---|
| *B60L 15/34* | (2006.01) |
| *B60L 15/20* | (2006.01) |
| *H02P 5/00* | (2016.01) |
| *B60K 7/00* | (2006.01) |
| *B60K 17/04* | (2006.01) |
| *B60K 1/02* | (2006.01) |

(52) U.S. Cl.
CPC ............ *B60L 15/34* (2013.01); *B60L 15/20* (2013.01); *B60L 15/2045* (2013.01); *H02P 5/00* (2013.01); *B60K 1/02* (2013.01); *B60K 7/0007* (2013.01); *B60K 17/04* (2013.01); *B60L 2200/18* (2013.01); *B60L 2220/42* (2013.01); *B60L 2240/423* (2013.01); *B60L 2250/26* (2013.01); *B60Y 2200/143* (2013.01)

(58) Field of Classification Search
None
See application file for complete search history.

(56) References Cited

U.S. PATENT DOCUMENTS

| | | | |
|---|---|---|---|
| 7,836,986 B1* | 11/2010 | Gillecriosd | B60W 20/40 180/65.21 |
| 9,096,135 B1* | 8/2015 | Simonini | B60L 11/1803 |
| 9,352,658 B2 | 5/2016 | Morris et al. | |
| 9,669,719 B1 | 6/2017 | Gerber et al. | |
| 2013/0193918 A1 | 8/2013 | Sarkar et al. | |
| 2016/0052505 A1* | 2/2016 | Zhou | B60L 7/14 701/22 |
| 2017/0063276 A1* | 3/2017 | Zhi | G01R 31/343 |
| 2017/0182898 A1 | 6/2017 | McGrath et al. | |

FOREIGN PATENT DOCUMENTS

| | | | |
|---|---|---|---|
| EP | 2 676 830 | 12/2013 | |
| EP | 2676830 A1 * | 12/2013 | ............. B60T 8/175 |
| EP | 2 685 624 | 1/2014 | |
| EP | 2685624 A1 * | 1/2014 | ............ B60L 15/025 |

OTHER PUBLICATIONS

Extended European Search Report issued in Application EP 18181986.3 dated Dec. 5, 2018 (7 pages).

* cited by examiner

*Primary Examiner* — Eduardo Colon Santana
*Assistant Examiner* — Zemenay T Truneh
(74) *Attorney, Agent, or Firm* — Bookoff McAndrews, PLLC (57) ABSTRACT

A method of operating an electric vehicle having multiple electric traction motors include receiving a signal indicative of a driver requested torque, and determining portions of the torque request to produce from each traction motor based on efficiency maps of the motors. The method may also include producing the determined portions of torque from each motor.

20 Claims, 6 Drawing Sheets

EFFICIENCY OPTIMIZATION OF MULTI-MOTOR ELECTRIC VEHICLES

TECHNICAL FIELD

The current disclosure relates to systems and methods for increasing efficiency of electric vehicles with multiple electric motors.

BACKGROUND

In an electric vehicle, energy stored in batteries is used to power an electric motor that propels the vehicle. A control system varies the electric current directed to the electric motor based on user input to produce rotation power. The rotational power produced by the electric motor is transmitted to drive wheels of the vehicle to propel the vehicle. In some cases, the electric vehicle may use multiple electric motors to increase its power. The systems and methods of the current disclosure may improve the efficiency of electric vehicles that use multiple electric motors for propulsion. The scope of the current disclosure, however, is defined by the attached claims, and not by the ability to solve any specific problem.

SUMMARY

Embodiments of the present disclosure relate to systems and methods for increasing the efficiency of multi-motor electric vehicles. Each of the embodiments disclosed herein may include one or more of the features described in connection with any of the other disclosed embodiments.

In one embodiment, a method of operating an electric vehicle having multiple electric motors for traction is disclosed. The method may include receiving, at a control unit of the vehicle, a signal indicative of a driver requested torque, and determining portions of the driver requested torque to produce from each motor of the multiple electric motors based on one or more efficiency maps of the multiple electric motors. The method may also include producing the determined portions of the driver requested torque from each motor of the multiple electric motors.

In another embodiment, a method of operating an electric vehicle having at least a first electric motor and a second electric motor for traction is disclosed. The method may include receiving, at a control unit of the vehicle, a signal indicative of a driver requested torque, and operating one of the first electric motor or the second electric motor to produce the entirety of the driver requested torque if the driver requested torque is less than a maximum torque capability of the electric vehicle. The method may also include operating both the first electric motor and the second electric motor to produce portions of the driver requested torque if the driver requested torque is not less than a maximum torque capability of the electric vehicle.

In yet another embodiment, an electric vehicle is disclosed. The electric vehicle may include a powertrain including a first electric motor and a second electric motor configured to provide traction for the electric vehicle and a control unit. The control unit may be configured to receive a signal indicative of a driver requested torque, and determine portions of the driver requested torque to produce from each of the first electric motor and the second electric motor based on an efficiency map of one or both of the first electric motor and the second electric motor. The control unit may also be configured to control the first electric motor and the second electric motor to produce the determined portions of the driver requested torque.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes systems and methods for increasing the efficiency of multi-motor electric vehicles. While principles of the current disclosure are described with reference to an electric bus having dual motors, it should be understood that the disclosure is not limited thereto. Rather, the systems and methods of the present disclosure may be broadly used in any electric vehicle (motorcycle, trains, cars, plane, etc.) having any number of electric motors for propulsion. Further, as used herein, the term electric vehicle is used to refer to any vehicle that uses an electric motor, alone or in conjunction with other power generation systems, for propulsion (e.g., fully electric vehicles, hybrid vehicles, etc.). In this disclosure, the terms "about," "substantially," or "approximate" are used to indicate a potential variation of 10% of the stated value.

Figure 1A:
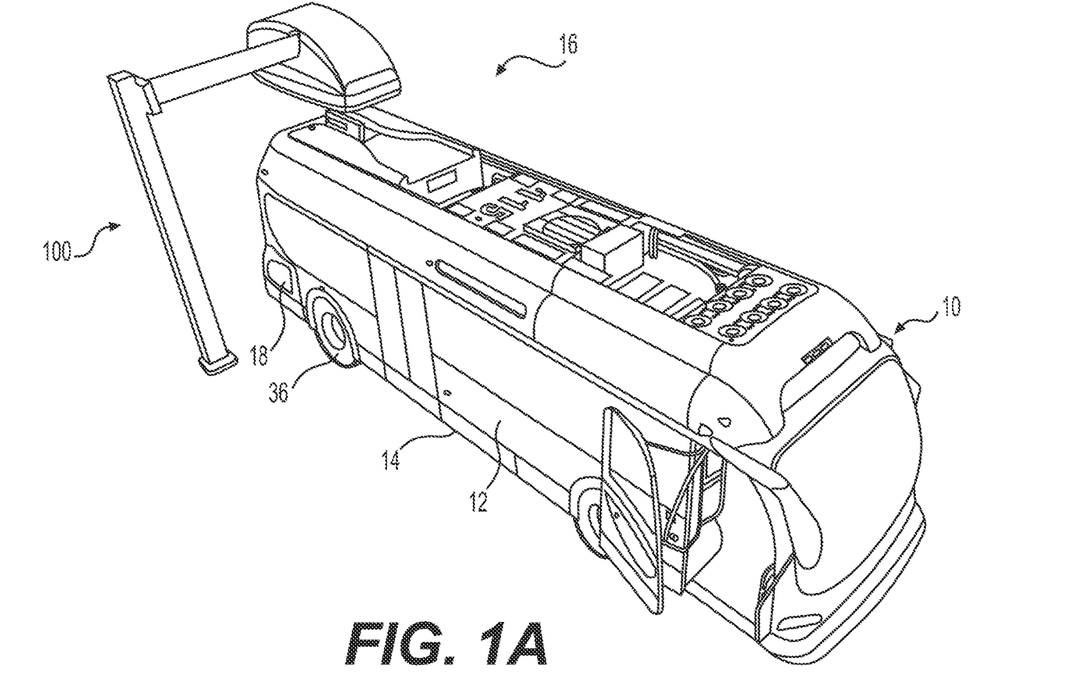
FIG. 1A illustrates a top perspective view of an exemplary electric bus of the current disclosure.
Figure 1B:
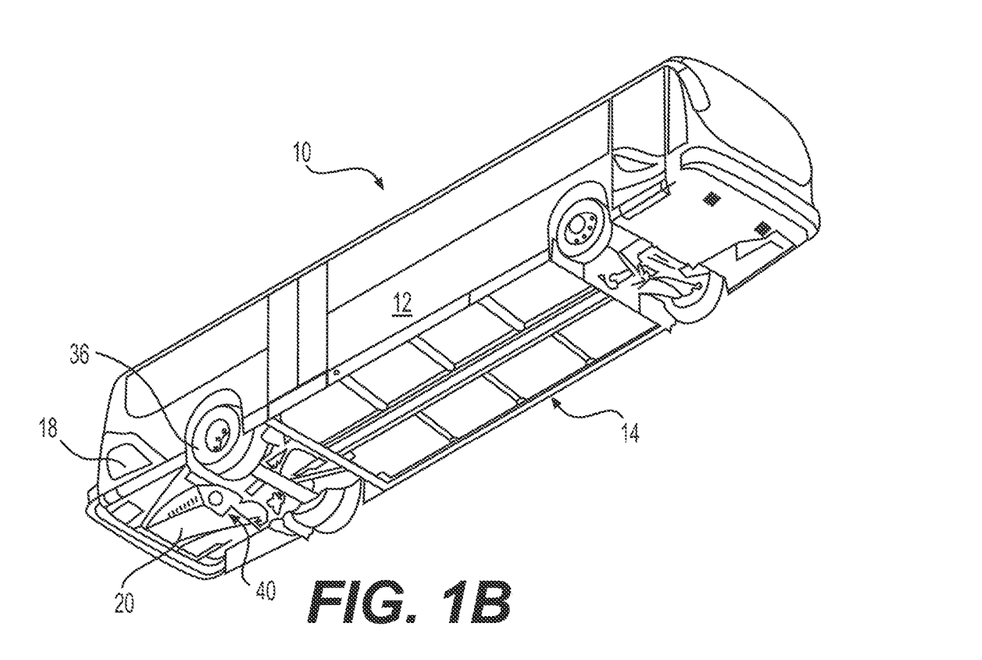
FIG. 1B illustrates a bottom perspective view of the electric bus of FIG. 1A.

FIGS. 1A and 1B illustrate an electric vehicle in the form of an electric bus 10. FIG. 1A shows the top view of the bus 10, and FIG. 1B shows the bottom view. In the discussion that follows, reference will be made to both FIGS. 1A and 1B. Electric bus 10 may include a body 12 enclosing a space for passengers. In some embodiments, some (or all) parts of body 12 may be fabricated using one or more composite materials to reduce the weight of the bus 10. In some embodiments, bus 10 may be a low-floor electric bus. As is known in the art, in a low floor bus, there are no stairs at the front and/or the back doors of the bus. In such a bus, the floor is positioned close to the road surface to ease entry and exit into the bus. In some embodiments, the floor height of the low-floor bus may be about 12-16 inches (30-40 centimeters) from the road surface. Body 12 of bus 10 may have any size, shape, and configuration.

Bus 10 may include a powertrain 40 that includes one or more electric motors 20 connected to drive wheels 36 of the bus 10. The electric motors 20 generate power for propulsion of the bus 10. Batteries of a battery system 14 may store electrical energy to power the electric motor(s) 20. When this energy decreases, the battery system 14 is recharged.

Battery system 14 may be recharged in any known manner (i.e., conductively, inductively, etc.). U.S. Pat. Nos. 9,352,658; 9,669,719; U.S. Patent Publication No. 2013/0193918; and U.S. patent application Ser. No. 14/980,697, commonly-assigned to the assignee of the current application, describe exemplary methods of charging the battery system 14. These references are incorporated by reference in their entirety herein. The battery system 14 may have a modular structure and may be configured as a plurality of battery packs having multiple battery cells. In general, the battery system 14 may be positioned anywhere on bus 10. In some embodiments, as illustrated in FIG. 1B, the battery packs may be positioned under the floor of the bus 10. The battery cells of the battery system 14 may have any chemistry and construction (e.g., lithium titanate oxide (LTO), nickel manganese cobalt (NMC), lead-acid, nickel cadmium, nickel metal hydride, lithium ion, zinc air, etc.).

Figure 2A:
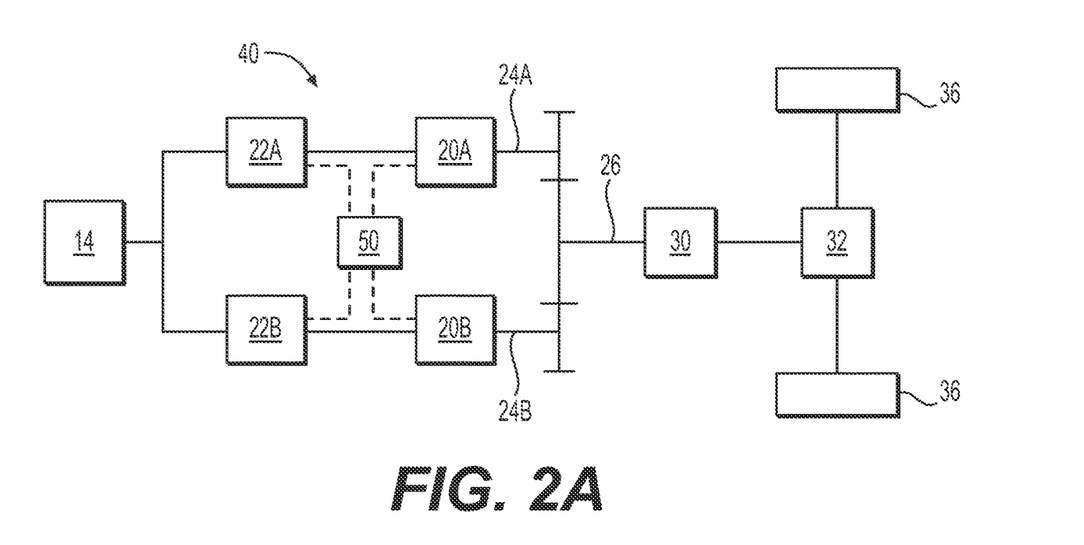
FIG. 2A is a schematic view of an exemplary powertrain of the bus of FIG. 1A.

FIG. 2A is a simplified schematic illustration of an exemplary powertrain 40 of the bus 10. The power train 40 includes two electric motors 20A and 20B connected to the drive wheels 36 of the bus 10 through a transmission 30 and a differential 32. As schematically illustrated in FIG. 2A, output shafts 24A, 24B of the two electric motors 20A, 2B may be connected to a common input shaft 26 of transmission 30 (e.g., through gearing) such that the two motors 20A, 20B together rotate the input shaft 26. Electric motors 20A and 20B may include any type of motor known in the art. In some embodiments, both motors 20A and 20B may be the same type of motor. However, in some embodiments, motors 20A and 20B may be different type of motors. In some embodiments, electric motors 20A and 20B may be permanent magnet AC motors. In some such embodiments, high voltage DC power from the batteries may be converted into 3-phase AC power using inverters 22A, 22B and directed to the motors 20A, 20B to produce torque. In general, the torque output of each motor 20A, 20B is proportional to the magnitude of the current directed to that motor. And, the total torque output of the powertrain 40 is equal to the sum of the torque output of the two motors 20A, 20B.

As illustrated in FIG. 2A, inverter 22A controls the current to motor 20A, and inverter 22B controls the current to motor 20B. The inverters 22A, 22B may be any type of inverter known in the art. Although two different inverters 22A, 22B (each feeding a single motor) are illustrated in FIG. 2A, in some embodiments, a single dual channel inverter may be used. In such embodiments, each channel of the inverter 32 may feed current to one of the electric motors 20A, 20B. In some embodiments, a commercially available inverter may be used as inverters 22A, 22B.

The transmission 30 may include multiple gears that selectively engage to switch between different gear ratios to convert the rotation speed (and torque) of the input shaft 26 to several different speeds (and torques) of the drive wheels 36. While, in general, any type of transmission 30 with any number of gear ratios may be used in bus 10, in some embodiments, transmission 30 may be an automated manual transmission that provides two gear ratios using a set of planetary gears. In addition to gears, as is known in the art, transmission 30 may also include components such as, for example, clutches, speed synchronizers, etc. The transmission 30 is connected to the drive wheels 36 through a differential 32. As known in the art, the differential transmits the rotational power from the transmission 30 to the two drive wheels 36.

Powertrain 40 also includes a control unit 50 that controls the operations of the powertrain 40. Control unit 50 may be a device dedicated to control operations of the powertrain 40, or it may be part of a device that controls several operations (for example, HVAC control, door opening/closing, kneeling, etc.) of the bus 10. As is known in the art, control unit 50 may include hardware (computational units, A/D converters, memory, switch, valves, actuators, fuses, etc.) and software (control logic, algorithms, etc.) that function collectively to control the operation of the powertrain 40. For the sake of brevity, only those operations of the control system 50 that are relevant to the current disclosure are discussed below. Based on data indicative of the operating conditions of bus 10, the control unit 50 may control the inverters 22A to 22B to vary the current directed to each motor 20A, 20B to produce any desired torque output.

Data indicative of the operating conditions may include, among others, signals indicative of desired torque (or speed), motor speed, motor input currents, etc. In some embodiments, the control unit 50 may determine the user desired torque based on input from the driver of the bus 10 (for example, based on the position of the accelerator pedal and/or the brake pedal). For example, signals from sensors associated with the accelerator and/or brake pedal may indicate the position (e.g., amount depressed, etc.) of these pedals. And, based on the position of these pedals, the control unit 50 may determine that the driver desires more speed/torque output (e.g., to climb a hill). The control unit 50 may then direct one or both of the inverters 22A, 22B to increase the current directed to its respective motor 20A, 20B to increase its speed/torque output. In some embodiments, the control unit 50 may monitor the output (e.g., speed) of each electric motor 20A, 20B and adjust the torque command to the inverters 22A, 22B, and the inverters may convert the torque command to current input to the motors (e.g., by using a feedback loop) to produce the desired torque output. The inverters 22A, 22B (and/or the control unit 50) may determine the current motor speed and input currents to the motors 20A, 20B based on sensor signals from the motors 20A, 20B (and/or the inverters 22A, 22B).

Figure 2B:
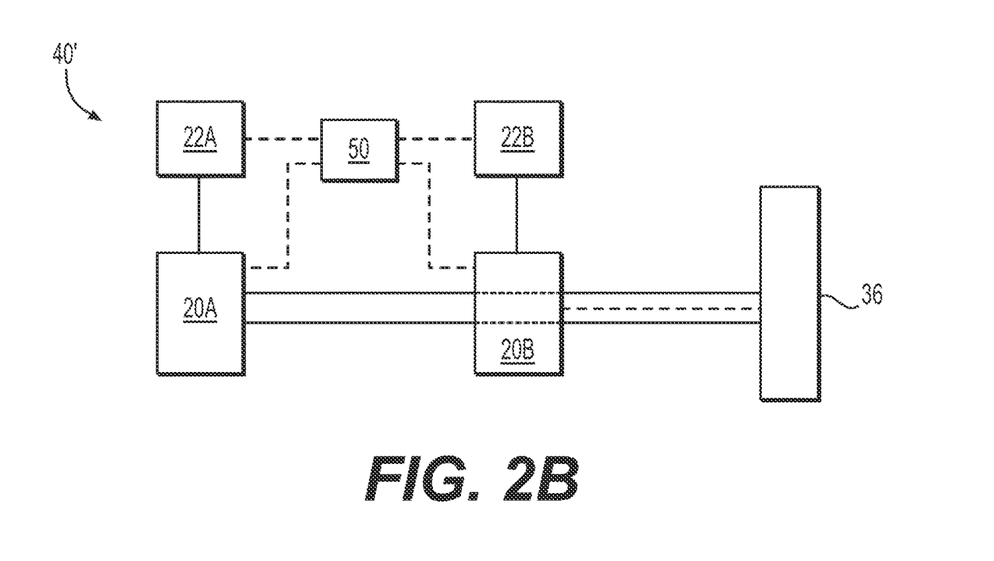
FIGS. 2B and 2C are schematic views of portions of other exemplary powertrains of the bus of FIG. 1A.
Figure 2C:
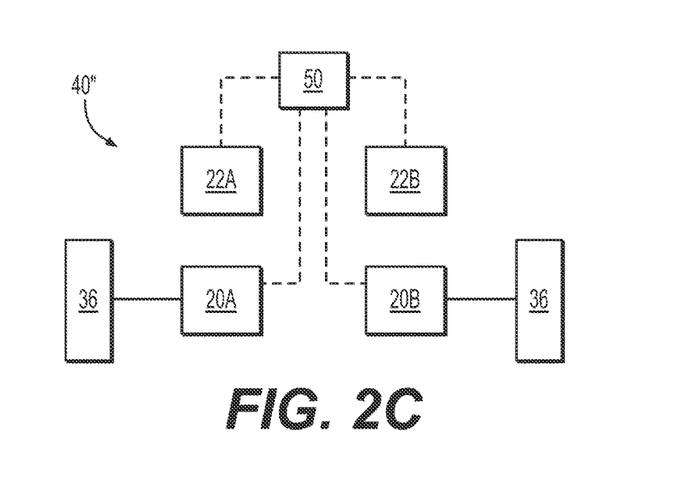

Although FIG. 2A illustrates powertrain 40 as including two motors 20A, 20B being coupled to a common input shaft 26 using gears, this is only exemplary. As would be known to a people skilled in the art, the two motors 20A and 20B may be coupled together in any manner to together drive the input shaft 26. Further, although only two electric motors 20A and 20B are illustrated in FIG. 2A, in general, powertrain 40 may include any number of electric motors coupled together to produce torque. FIG. 2B and FIG. 2C illustrate other embodiments of powertrains having multiple motors coupled to one or more drive wheels 36. In powertrain 40' of FIG. 2B, motors 20A and 20B are coupled in a serial manner to a drive wheel 36. The motors 20A and 20B may be serially connected by any method known in the art. For example, using hollow shafts. The control unit 50 controls each motor 20A and 20B independently through inverters 22A and 22B, respectively. That is, control unit 50 may selectively control each inverter independently to vary the torque output of the motor connected to that inverter. In powertrain 40" of FIG. 2C both the speed and the torque of the two motors 20A and 20B can be independently varied. However, in powertrain 40 of FIG. 2A and powertrain 40' of FIG. 2B, only the torque of motors 20A and 20B can be independently varied. In powertrain 40" of FIG. 2C, motor 20A is connected to one drive wheel 36 and another motor 20B is connected to a different drive wheel 36. Motor 20A is controlled by inverter 22A, and motor 20B is controlled by inverter 22B. It should be noted that the dual-motor powertrains of FIGS. 2A-2C are only exemplary, and the current disclosure is applicable to any type of powertrain that uses multiple motors (two, three, four, etc.) for propulsion of the vehicle.

Figure 3:
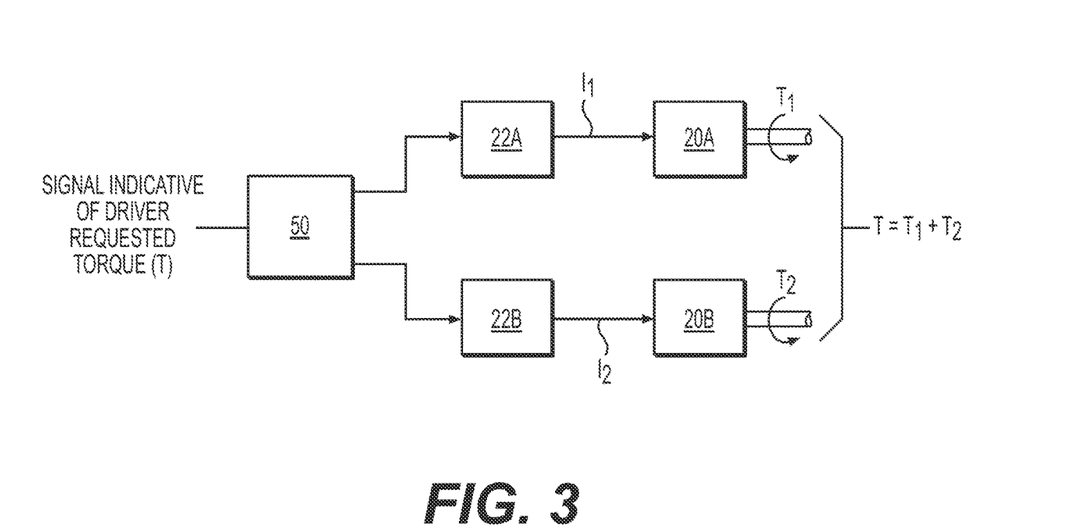
FIG. 3 is a schematic illustration of an exemplary operation of the powertrain of FIG. 2A.

FIG. 3 illustrates a simplified schematic that illustrates the control unit 50 controlling the two motors 20A, 20B independently to produce a driver requested torque output. When the control unit 50 receives a signal indicative of a driver torque request (T), the control unit 50 may instruct one or both the inverters 22A, 22B (i.e., send torque request to the inverters) to vary the current directed to its connected motor to produce the driver requested torque output. For example, if a signal to the control unit 50 indicates that the driver requested torque output is 100 Nm (newton meter), the control unit 50 may instruct inverter 22A to control motor 20A to produce a portion of the driver requested torque (e.g., 10 Nm, 50 Nm, etc.), and instruct inverter 22B to control motor 20B to produce the remainder of the driver requested torque. In response to the instructions from control unit 50, inverter 22A may send a current $I_1$ to motor 20A and inverter 22B may send a current $I_2$ to motor 20B. Currents $I_1$ and $I_2$ may be configured to cause the motors 20A, 20B to output the respective requested torque. In some situations, the control unit 50 may instruct inverter 22A to control motor 20A to produce the entirety of the driver requested torque (i.e., 100 Nm). In general, the control unit 50 may instruct the multiple motors of the powertrain to produce any portion of the driver requested torque such that the total output of all the motors will equal the driver requested torque.

Figure 4A:
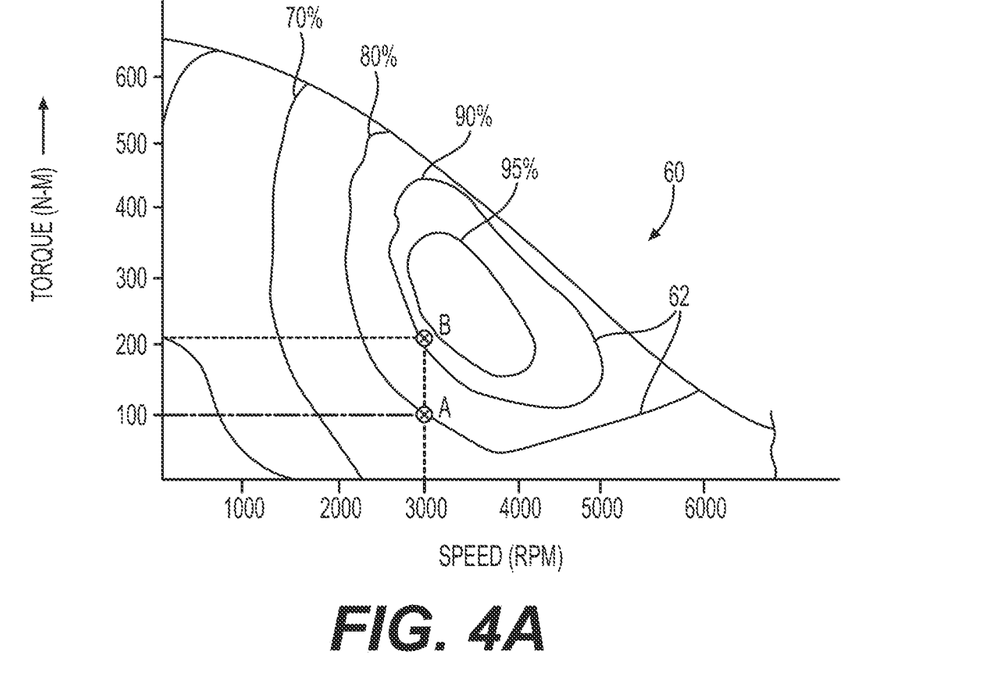
FIG. 4A is an exemplary efficiency map of an electric motor of the bus of FIG. 1A.

In response to a driver torque request, the control unit 50 may determine the portion of torque to produce from each motor 20A, 20B and instruct the inverter associated with each motor to produce the desired portion. In some embodiments, the control unit 50 may determine the relative portions of torque to produce from each motor 20A, 20B based on an efficiency map (tables, charts, plots, curves, etc.) of the motor. The efficiency map of an electric motor system indicates the efficiency of the motor as a function of its speed and output torque. FIG. 4A illustrates an efficiency map 60 of an exemplary motor (e.g., motors 20A and 20B) in the form of a graph. It should be noted that, although the efficiency map 60 is illustrated as a graph, this is only exemplary. As would be recognized by a person of ordinary skill in the art, in general, the efficiency map may be in any form (e.g., tables, charts, equations, etc.). For example, the data represented by the curves of FIG. 4A may be expressed in a different form. The x-axis of the graph indicates the speed of the motor in RPM and the y-axis indicates the torque output of the motor. The efficiency map may be determined by any method. In some cases, the efficiency map may be based on experiments or may be provided by the motor manufacturer. Iso-efficiency lines 62 in the map 60 indicate the efficiency of the motor at different speed and torque combinations. For example, the line marked 80% indicates that the efficiency of the motor at the speed and torque corresponding to every point on the line will about 80%. Based on the map 60, if the motor outputs a torque of 200 Nm at 3000 RPM, it will have an efficiency of about 90%. Within limits, increasing the torque output at the same speed increases efficiency, and decreasing the speed at the same torque output decreases efficiency.

With reference to the efficiency map 60 of FIG. 4A, in vehicles having only a single electric motor for propulsion, the efficiency of the vehicle changes based on the torque requested by the driver. For example, if at an instant, the single motor is producing 200 Nm at 3000 RPM (i.e., at operating point "B" in efficiency map 60), the motor is operating at about 90% efficiency. If the driver requested torque decreases to 100 Nm, the operating point of the single motor shifts to "A" (in the efficiency map 60) to satisfy the driver's request, causing the motor efficiency to decrease to about 80%. However, in embodiments of the current disclosure where the powertrain includes multiple motors, the control unit 50 has several options to choose the portion of torque to produce from each motor 20A, 20B to satisfy the driver's torque request. And, the control unit 50 selects the option (e.g., x % of the torque request from motor 20A and the remainder from motor 20B) that increases, or optimizes, the efficiency of the powertrain 40. For example, with reference to FIG. 4A, if the driver requests a torque of 200 Nm at 3000 RPM, among other available options, the control unit 50 can instruct each motor to produce 100 Nm at 80% efficiency (see "A" in FIG. 4A), or have motor 20A produce the entire 200 Nm (with motor 20B producing no torque) at 90% efficiency (see "B" in FIG. 4A). To increase the efficiency of the powertrain (and thus the vehicle), the control unit 50 may control the motors 20A and 20B such that one of the motors (motor 20A or 20B) produces substantially the entire 200 Nm to satisfy the driver's request. In general, the control unit 50 may instruct the multiple motors of the powertrain to produce any portion of the driver requested torque to increase efficiency of the vehicle.

Figure 4B:
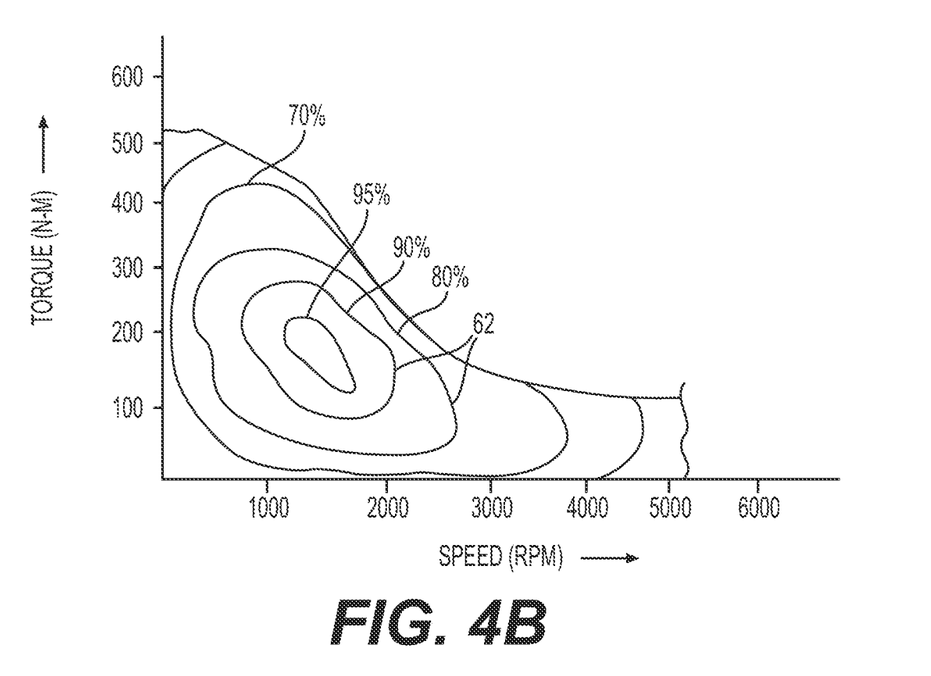
FIG. 4B is another exemplary efficiency map of an electric motor of the bus of FIG. 1A.

In the discussion above, both motors 20A and 20B are assumed to have the same efficiency map 60. However, this is not a requirement. In embodiments where some or all of the multiple motors have different efficiency maps (e.g., different motors), the control unit may select the portion of driver requested torque to produce from each motor (to increase or optimize efficiency) based on the efficiency maps of each motor. FIG. 4B illustrates another exemplary efficiency map 60' of a motor (in the form of a graph) that is more efficient at lower speeds as compared to the efficiency map 60 of FIG. 4A. Assume that in powertrain 40 of FIG. 3, motor 20A has efficiency characteristics as defined by map 60 (of FIG. 4A) and motor 20B has efficiency characteristics as defined by map 60' (of FIG. 4B). In such an embodiment, control unit 50 may control the motors 20A and 20B based on both the efficiency maps 60 and 60'. For example, if the driver requests torque at a lower speed (e.g., at about 1500 RPM), the control unit 50 may instruct motor 20B (i.e., the motor that is more efficient at lower speeds) to produce a greater portion (e.g., 80%, 100%, etc.) of the requested torque, and if the driver requests torque at a higher speed (e.g., at about 3000 RPM), the control unit 50 may instruct motor 20A to produce a greater portion of the requested torque.

Figure 5A:
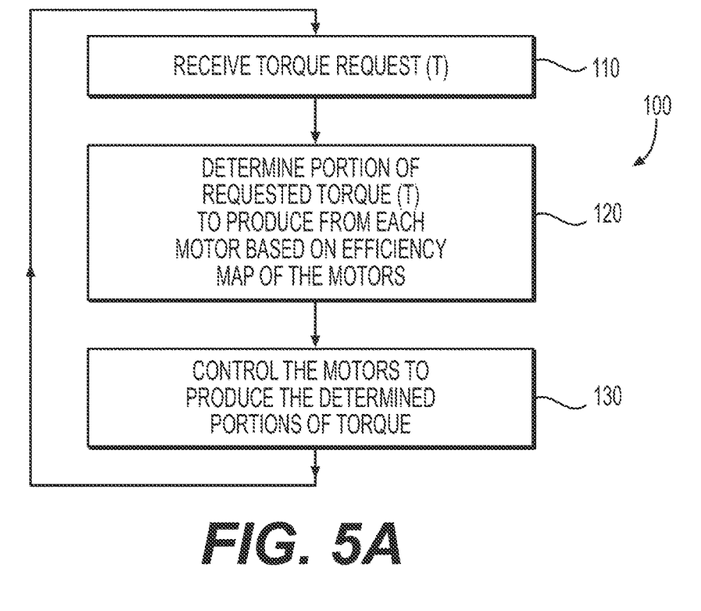
FIGS. 5A-5C are flow charts that illustrate exemplary methods of operating the powertrain of the bus of FIG. 1A.

FIG. 5A is a flow chart that illustrates an exemplary method 100 of controlling a powertrain having multiple electric motors for traction of the bus 10. Upon receipt of a request for a requested torque (T) from the driver of the bus 10 (step 110), the control unit 50 may determine the portion of the requested torque (T) to produce from each motor of the multiple traction motors based on efficiency maps of the motors (step 120). For example, the control unit 50 may determine the portion of torque T to produce from each motor to increase the efficiency of the powertrain. As explained previously, each motor may have the same or a different efficiency map. In some embodiments, the efficiency map(s) may be stored in the control unit 50. The control unit 50 may then control the motors to produce the determined portions of the requested torque (T) (step 130).

Figure 5B:
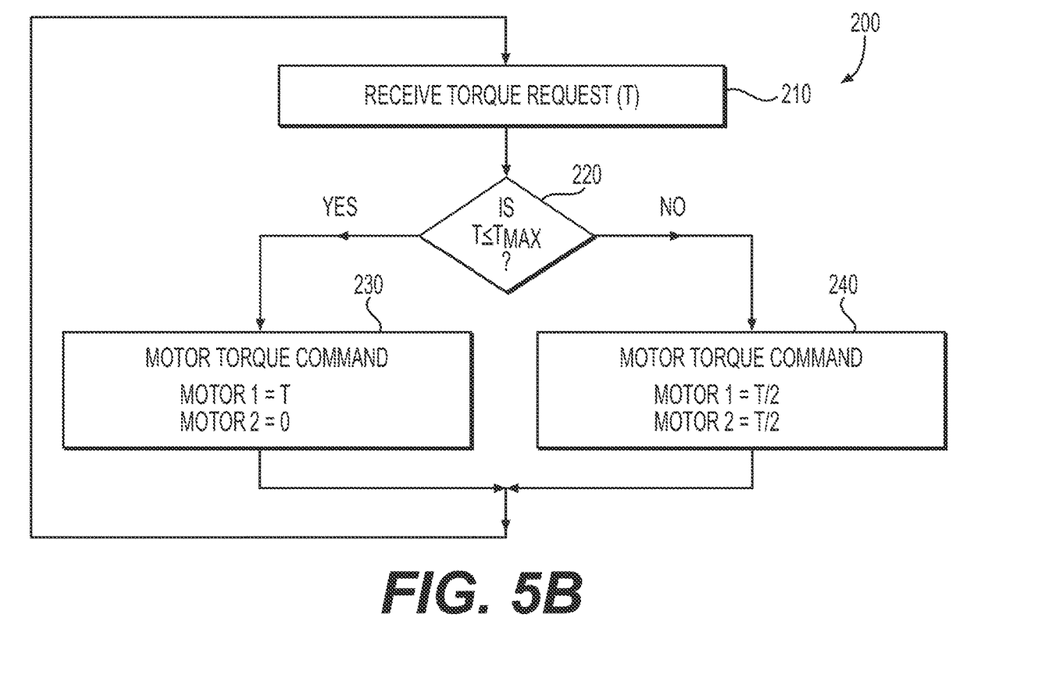

FIG. 5B is another exemplary method 200 of controlling a powertrain having two traction motors. Upon receipt of a torque request (T) (step 210), the control unit 50 may determine if the requested torque (T) is less than or equal to the maximum torque capability $T_{MAX}$ of a motor in the powertrain (step 210). $T_{MAX}$ is the maximum value of the maximum torque output capability of each motor in the powertrain. For example, if the maximum torque output capability of motor 1 is $T_1$ and that of motor 2 is $T_2$ ($T_2<T_1$), $T_{MAX}=T_1$. If the requested torque (T) is less than or equal to $T_{MAX}$ (i.e., step 210=Yes), the control unit 50 may command one of the motors (e.g., motor 1 in the example above) to produce the entirety of the requested torque (T) (step 230). However, if T is not less than $T_{MAX}$ (i.e., step 220=No), the control unit 50 may instruct each of the two motors to produce half the requested torque (i.e., T/2) (step 230). In some embodiments, (for example, if based on the efficiency maps of the two motors, it is more efficiency to operate motor 2 at its maximum output), the control unit 50 may instruct motor 2 to produce a torque of $T_2$ (its maximum torque output capability), and motor 1 to produce the remaining torque (i.e., $T-T_2$). In general, in steps 230 and/or step 240, the control unit 50 may instruct the different motors of the powertrain to produce different portions of the requested torque (based on the efficiency maps of the respective motors) to increase the overall efficiency of the powertrain. Although method 200 is described for a powertrain having two traction motors, the method is equally applicable to a powertrain having any number or traction motors (e.g., X number of motors).

Figure 5C:
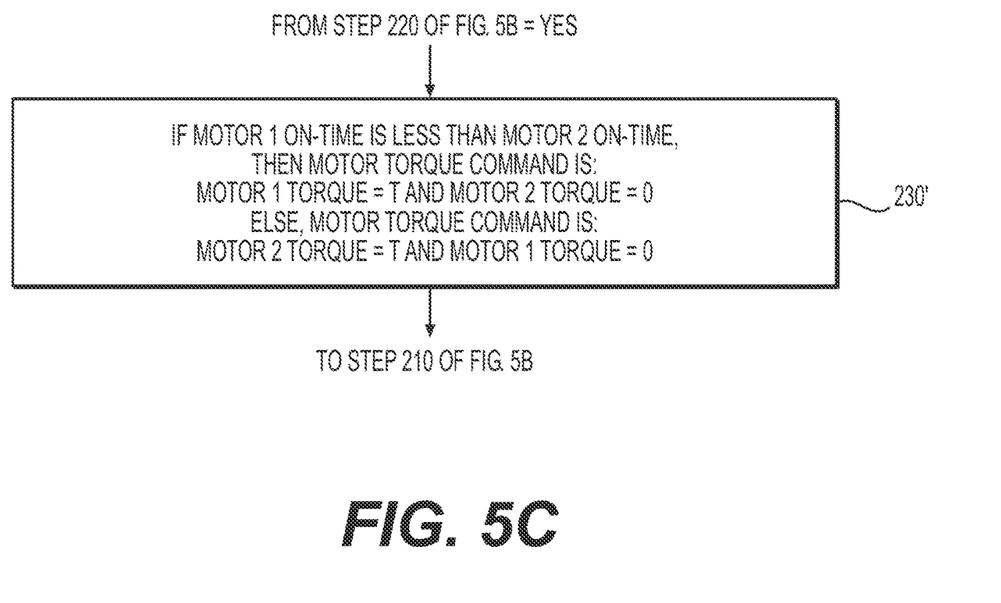

In some embodiments, the control unit 50 may control the motors 20A and 20B based on additional factors. For example, to prevent unbalanced use of the motors (e.g., excessive use of one motor compared to the other, etc.), in some embodiments, the control unit 50 may track the total usage of each traction motor of the powertrain, and control the motors such that the usage of each of the motors is comparable. To determine usage, the control unit 50 may track any parameter (e.g., usage time, torque output, power output, current consumption, etc. over the lifetime) of the motor that indicates the relative usage of the different motors in the powertrain. For example, in step 120 of method 100 (of FIG. 5A), the control unit 50 may determine the portion of the driver requested torque (100%, 10%, etc.) to produce from different motors of a multi-motor powertrain based on the efficiency map of the motors and the total usage time (or total torque produced, etc.) of each motor. And, in some embodiments, the control unit 50 may replace step 230 of FIG. 5B with step 230' of FIG. 5C, where motor 1 on-time and motor 2 on-time are the total usage times of the respective motors. That is, if a single motor of the powertrain is used to produce the entirety of the driver requested torque T, the control unit 50 may alternate the motors so that one of the motors is not used significantly more that another.

While the current disclosure describes controlling the powertrain of an electric bus, it should be understood that the disclosure is not limited thereto. Rather, the principles described herein may be used to control the powertrain of any multi-motor electric vehicle. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:
1. A method of operating an electric vehicle having multiple electric motors for traction, comprising:
receiving, at a control unit of the vehicle, a signal indicative of a driver requested torque;
comparing the driver requested torque with a maximum torque capability of a first electric motor and a maximum torque capability of a second electric motor;
determining portions of the driver requested torque to produce from the first and second electric motors based on (a) one or more efficiency maps of the first and second electric motors, (b) a total usage time over the lifetime of each the first and second electric motors, and (c) the comparison of the driver requested torque with the maximum torque capability of the first electric motor and the maximum torque capability of the second electric motor; and
producing the determined portions of the driver requested torque from the first and second electric motors.

2. The method of claim 1, wherein producing the determined portions include producing the entirety of the driver requested torque from the first electric motor or the second electric motor.

3. The method of claim 1, wherein the determined portions of the driver requested torque to produce from the first and/or second electric motors are further based on (a) total torque output of each motor over the lifetime of the first and second electric motors, (b) power output of each motor over the lifetime of the first and second electric motors, and/or (c) total current consumption of each motor over the lifetime of the first and second electric motors.

4. The method of claim 1, wherein producing the determined portions include producing a substantially equal portion of the driver requested torque from each motor of the first and second electric motors.

5. A method of operating an electric vehicle having at least a first electric motor and a second electric motor for traction, comprising:
receiving, at a control unit of the vehicle, a signal indicative of a driver requested torque;
determining whether the driver requested torque is less than or equal to a maximum torque capability of the first electric motor and/or a maximum torque capability of the second electric motor;
as a result of determining that the driver requested torque is less than or equal to the maximum torque capability of the first electric motor or the maximum torque capability of the second electric motor, operating one electric motor of the first electric motor or the second electric motor to produce the entirety of the driver requested torque, wherein the one electric motor is selected for operation based on at least one of (a) a total usage time of each motor of the first and second electric motors over the lifetime of the motor, (b) total torque output of each motor over the lifetime of the motor, (c) total power output of each motor over the lifetime of the motor, or (d) total current consumption of each motor over the lifetime of the motor; and
as a result of determining that the driver requested torque is greater than the maximum torque capability of the first electric motor and the maximum torque capability of the second electric motor, operating both the first electric motor and the second electric motor to produce portions of the driver requested torque.

6. The method of claim 5, wherein operating both the first electric motor and the second electric motor includes determining portions of the driver requested torque to produce from each of the first electric motor and the second electric motor based on an efficiency map of one or both of the first electric motor and the second electric motor.

7. The method of claim 6, wherein determining portions of the driver requested torque to produce from each of the first electric motor and the second electric motor includes determining the portions based on a single efficiency map of both the first electric motor and the second electric motor.

8. The method of claim 6, wherein determining portions of the driver requested torque to produce from each of the first electric motor and the second electric motor includes determining the portions based on a different efficiency maps of the first electric motor and the second electric motor.

9. The method of claim 5, wherein operating both the first electric motor and the second electric motor includes operating the first electric motor and the second electric motor to produce substantially equal portions of the driver requested torque.

10. The method of claim 5, wherein operating one electric motor includes selecting the first electric motor as the one electric motor if the total usage time of the first electric motor is less than the total usage time of the second electric motor.

11. An electric vehicle, comprising:
a powertrain including a first electric motor and a second electric motor configured to provide traction for the electric vehicle; and
a control unit configured to:
receive a signal indicative of a driver requested torque;
compare the driver requested torque with a maximum torque capability of the first electric motor and a maximum torque capability of the second electric motor;
determine portions of the driver requested torque to produce from each of the first electric motor and the second electric motor based on (a) an efficiency map of one or both of the first electric motor and the second electric motor, (b) a total usage time of each motor of the first and second electric motors over the lifetime of the motor, and (c) the comparison of the driver requested torque with the maximum torque capability of the first electric motor and the maximum torque capability of the second electric motor; and
control the first electric motor and the second electric motor to produce the determined portions of the driver requested torque.

12. The electric vehicle of claim 11, further including a first inverter and a second inverter, wherein the first inverter is configured to independently control the first electric motor and the second inverter is configured to independently control the second electric motor.

13. The electric vehicle of claim 11, wherein the control unit is configured to control one of the first electric motor or the second electric motor to produce the entirety of the driver requested torque.

14. The electric vehicle of claim 11, wherein the control unit is configured to select the first electric motor to produce the entirety of the driver requested torque if the total usage time of the first electric motor is less than the total usage time of the second electric motor.

15. The electric vehicle of claim 11, wherein the control unit is configured to control the first electric motor and the second electric motor to produce substantially equal portions of the driver requested torque.

16. The electric vehicle of claim 11, wherein the determined portions of the driver requested torque to produce from each of the first electric motor and the second electric motor are further based on one or more of (i) total torque output of each motor over the lifetime of the motor, (ii) total power output of each motor over the lifetime of the motor, and/or (iii) total consumption of each motor over the lifetime of the motor.

17. The electric vehicle of claim 11, further including a first drive wheel and a second drive wheel, wherein the first electric motor is configured to provide traction to only one of the first drive wheel and the second drive wheel and the second electric motor is configured to provide traction to only the other of the first drive wheel and the second drive wheel.

18. The electric vehicle of claim 11, further including a first drive wheel driven by the first electric motor and a second drive wheel driven by the second electric motor, wherein the first drive wheel and the second drive wheel are arranged substantially along a single axis.

19. The electric vehicle of claim 11, wherein the control unit is configured to control the first electric motor and the second electric motor to produce different portions of the driver requested torque.

20. The electric vehicle of claim 1, wherein each electric motor of the first and second electric motors includes a same efficiency map.

* * * * *